US009069823B2

(12) United States Patent
Adda et al.

(10) Patent No.: US 9,069,823 B2
(45) Date of Patent: Jun. 30, 2015

(54) METHOD FOR MANAGING A RELATIONAL DATABASE OF THE SQL TYPE

(75) Inventors: Serge Adda, Antony (FR); Olivier Chedru, Paris (FR)

(73) Assignee: INFOVISTA SA, Les Ulis (FR)

( * ) Notice: Subject to any disclaimer, the term of this patent is extended or adjusted under 35 U.S.C. 154(b) by 643 days.

(21) Appl. No.: 12/728,937

(22) Filed: Mar. 22, 2010

(65) Prior Publication Data

US 2010/0250540 A1    Sep. 30, 2010

(30) Foreign Application Priority Data

Mar. 24, 2009    (FR) ...................... 09 51902

(51) Int. Cl.
*G06F 17/30* (2006.01)
(52) U.S. Cl.
CPC .... *G06F 17/30551* (2013.01); *G06F 17/30327* (2013.01); *G06F 17/30312* (2013.01)
(58) Field of Classification Search
None
See application file for complete search history.

(56) References Cited

U.S. PATENT DOCUMENTS

| | | | | |
|---|---|---|---|---|
| 5,251,316 | A * | 10/1993 | Anick et al. ........................ | 1/1 |
| 6,134,588 | A * | 10/2000 | Guenthner et al. ............ | 709/226 |
| 6,567,815 | B1 * | 5/2003 | Rubin et al. ........................ | 1/1 |
| 7,552,137 | B2 * | 6/2009 | Beck et al. ........................ | 1/1 |
| 7,970,742 | B2 * | 6/2011 | Hanckel et al. ............... | 707/673 |
| 2004/0268240 | A1 * | 12/2004 | Vincent, III .................... | 715/513 |
| 2005/0182776 | A1 * | 8/2005 | Yennie ........................ | 707/100 |
| 2006/0235821 | A1 | 10/2006 | Armangau et al. | |
| 2007/0282806 | A1 * | 12/2007 | Hoffman et al. ................. | 707/3 |
| 2008/0016074 | A1 * | 1/2008 | Ben-dyke et al. ................ | 707/7 |

FOREIGN PATENT DOCUMENTS

EP    1 471 447 A2    10/2004

OTHER PUBLICATIONS

Demaine et al., "Dynamic Optimality—Almost", Oct. 17-19, 2004, Proceedings of the 45th Annual IEEE Symposium on Foundations of Computer Science, pp. 484-490.*
Praveen, "The Design and Implementaion of a Sequence Database System", 1996, pp. 99-110, XP002559249, URL:http://www.sigmond.org/vldb/conf/1996/P099.PDF.
Torp K., et al., "Effective Timestamping in Databases", VLDB Journal, Springer Verlag, Berlin, DE., vol. 8, Jan. 1, 1999, pp. 267-288, XP00118730, ISSSN: 1066-8888.
Anonymous: "Time Series: The Next Step for Telecommunications Data Management", Informix White Paper, Jan. 1, 1999, page complete, XP002364437.

* cited by examiner

*Primary Examiner* — Christyann Pulliam
*Assistant Examiner* — Charles Adams
(74) *Attorney, Agent, or Firm* — Greer, Burns & Crain, Ltd.

(57) ABSTRACT

A method is provided for managing a relational database of the SQL type for information technology and network infrastructure service information, including a method in which the following are created, in a system for managing a database of the MySQL type,
   a read-only data storage engine, and
   unmodifiable tables, for example of WORM, defined as "Write Once Read Many" type managed by the storage engine; each table includes a column of digital counting data called a "timestamp"; each table is partitioned by time intervals; partition files are grouped in subdirectories of a file system, these directories forming a tree structure, each node of which is uniquely identified from a timestamp.

8 Claims, 4 Drawing Sheets

| Card(V')=7 ||
|---|---|
| Index | Position |
| 0 | 3 |
| 1 | 1 |
| 2 | 5 |
| 3 | 0 |
| 4 | 2 |
| 5 | 4 |
| 6 | 6 |

| Index | Position Card(V')=15 | Position Card(V')=12 |
|---|---|---|
| 0 | 7 | 7 |
| 1 | 3 | 3 |
| 2 | 11 | 10 |
| 3 | 1 | 1 |
| 4 | 5 | 5 |
| 5 | 9 | 9 |
| 6 | 13 | 11 |
| 7 | 0 | 0 |
| 8 | 2 | 2 |
| 9 | 4 | 4 |
| 10 | 6 | 6 |
| 11 | 8 | 8 |
| 12 | 10 | |
| 13 | 12 | |
| 14 | 14 | |

| Column Name | Datatype | |
|---|---|---|
| Timestamp | TIMESTAMP | |
| AgentId | INTEGER | |
| CustomerId | INTEGER | |
| ServiceId | INTEGER | ← "DNS Identifier" |
| ClientIp | varbinary(16) | |
| ServerIp | varbinary(16) | |
| ProtocolId | INTEGER | |
| Port | INTEGER | |
| ApplicationSetId | INTEGER | |
| ApplicationId | INTEGER | |
| IpServiceId | INTEGER | |
| ClientCosId | INTEGER | |
| ServerCosId | INTEGER | |
| Mapped | TINYINT(4) | |
| ClientCountryId | INTEGER | |
| ClientRegionId | INTEGER | |
| ClientOfficeId | INTEGER | |
| ServerCoutryId | INTEGER | |
| ServerRegionId | INTEGER | |
| ServerOfficeId | INTEGER | |
| SourceId | INTEGER | |
| ClientInterfaceId | INTEGER | |
| ServeInterfaceId | INTEGER | |
| ClientBytes | BIGINT(20) | |
| ServerBytes | BIGINT(20) | |
| ClientPackets | BIGINT(20) | |
| ServerPackets | BIGINT(20) | |
| ActiveCommIp | BIGINT(20) | |
| IPPType | INTEGER | |
| ClientIplookup | VARCHAR(128) | |
| ServerIplookup | VARCHAR(128) | |

FIG. 9

| | |
|---|---|
| DNS Identifier | serviceId |
| DNS Lookup Suffix | Lookup |
| DNS Servers | *:(host=@default) |
| | 12: 10.1.13.12, 10.1.13.13 |
| | 13: 10.1.13.14, 10.1.13.15 |

FIG. 10

METHOD FOR MANAGING A RELATIONAL DATABASE OF THE SQL TYPE

BACKGROUND

The present invention relates to a method for managing a relational database of the SQL type for information technology (servers, applications, etc.) and network infrastructure service information.

Technological convergence of the services offered by telecommunications operators has underlined the need for new tools (Voice over IP, SMS, etc.) making it possible to manage the performance of a large number of simultaneous transactions. Furthermore, the current networks support streams of several tens of Gigabits. This implies for the tools managing the performance and quality of services (direct IP capture, Netflow monitoring, softswitch management) that there is a need for very high database insertion rates.

SUMMARY

The purpose of the present invention is a database management system capable of efficiently managing a substantial data stream. In particular a very high data insertion rate is sought, as well as deletion of outdated data as and when required. A further purpose of the invention is to generate reports in real time. A further purpose of the present invention is also efficient index creation.

At least one of the above objectives is achieved with a method for managing a relational database of the SQL type for information technology and network infrastructure service information; a method in which the following are created, in a system for managing a relational database of MySQL type for example, a read-only data storage engine, and
   unmodifiable tables managed by the storage engine; each table comprises a column of digital counting data called a "timestamp"; each table is partitioned by time intervals; partition files are grouped in subdirectories of a file system, these directories forming a tree structure, each node of which is uniquely identified from a timestamp.

The tables according to the invention are unmodifiable, i.e. they allow data to be written but do not allow modification. It is possible to write once and to read as many times as desired without ever physically being able to change the written data entry. Outdated data can nevertheless be deleted by the system in order to be replaced by more recent data. It is possible for example, non-limitatively, to use the technology called pseudo-WORM (Write Once Read Many), where the system can delete outdated data under certain conditions.

With the method according to the invention, the read-only storage engine makes it possible to handle the insertion data only, but not the updating of data already present in the system. Thus functionalities such as transactions, updates, etc. are avoided which slow the system as they are demanding users of computing time. Thus all unnecessary demands on resources are avoided. Advantageously, for indexed data, the indexes according to the invention do not require any maintenance and are never rebuilt. They can therefore be optimal both in access time and in disk space occupied.

According to an advantageous embodiment of the invention, the column called "timestamp" is used to merge partitions together into a new partition, and a time interval is defined for this new partition according to the age of the data contained therein.

In order to allow in particular the provision of reports in real time, the partitions can firstly be built in memory then written to a disk, these partitions in memory being accessible by SQL-type queries.

According to a feature of the invention, each partition comprises a data file and at least one index file consisting of a perfect binary tree, and a bijective function called TreeOrder is used for generating said perfect binary tree and to write sequentially values of said perfect binary tree to the index file according to an existing order relationship existing between the values of the perfect binary tree.

The bijective function is advantageously designed so as to establish the correspondence between on the one hand, each node of the perfect binary tree, these nodes being numbered from top to bottom and from left to right, and on the other hand the values of the perfect binary tree when stored in a section of the index file.

Preferably, the correspondence consists of providing the position of each node in the section of the index file according to the position of the corresponding value in a list established according to said order relationship and according to the cardinality of this same list.

According to an embodiment of the invention, when the perfect binary tree is incomplete and has a cardinality equal to C, the values of this incomplete perfect binary tree are classified with respect to the smallest complete perfect binary tree of cardinal N capable of containing C nodes as follows:

starting from a position $\text{TreeOrder}_N(i)$ in the complete perfect binary tree for an i<C, with i an index of this table, a position $\text{TreeOrder}_C(i)$ is determined in the incomplete perfect binary tree as follows:

Let $L=C*2-N$, with $N=2^{roundup(log\ 2(C))}-1$.
   If $\text{TreeOrder}_N(i)>L$ then
      $\text{TreeOrder}_C(i)=\text{TreeOrder}_N(i)-(\text{TreeOrder}_N(i)-L)/2$
   Else
      $\text{TreeOrder}_C(i)=\text{TreeOrder}_N(i)$ According to the invention, each index file can comprise:
   a header,
   one perfect binary tree,
   a section of string tables, and
   an optional section for index values.

In particular, when the space allocated to the perfect binary tree in the index file is fully occupied by values, additional values are then stored in the optional section.

Moreover, when a table is intended to contain a column of data of the IP address type, this table contains moreover an additional column containing results of the DNS resolution of said IP addresses, this resolution being carried out during the insertion of said IP addresses into the first column. The storage engine can advantageously comprise a module carrying out parallel DNS resolution.

BRIEF DESCRIPTION OF THE DRAWINGS

Other advantages and features of the invention will become apparent on examination of the detailed description of an embodiment which is in no way limitative, and the attached drawings, in which:

FIG. 9 is a view showing a definition of an IPDR table; and

FIG. 10 is a view showing a DNS configuration window of the IPDR table in FIG. 9.

DETAILED DESCRIPTION

The method according to the present invention advantageously makes it possible, using the Netflow protocol, to monitor a 10 Gb capacity link using a simple desktop computer. Such a link generates between 1 and 3% of Netflow data, i.e. a traffic between 100 and 300 Mb/s. Assuming a traffic with conversions of around 10 packets, the number of Netflow records can be estimated on an average standard network at approximately 100,000 records per second.

Although the invention is not limited thereto, the method according to the invention will now be described implemented in a system for managing a MySQL 5.1 database.

The present invention is advantageously applied to data relating to technical events. These data are generated automatically with a "timestamp" or ascending digital counter and are not subsequently modified.

In order to manage the data efficiently, bulk partitioning of the tables contained in the database according to the invention is used. Partitioning makes it possible to delete, in a single system call, data corresponding to a time period. The standard method, consisting of deleting the rows of a table, is too costly. But partitioning remains above all a means of constructing the indexes for a time period, without having to return later to a period already processed. This makes it possible to transform a problem of overall optimization into a problem of local optimization, the locality being a temporal locality.

The partitioning consists of dividing a SQL table. This division is defined by segmentation rules applied to a sub-set of the values of the columns. MySQL 5.1 proposes a standard partitioning which comprises too many restrictions. In particular the database must be capable of reading all the partitions at the same time; this results in a severe constraint for the operating system on the number of files open simultaneously. This constraint does not allow the bulk partitioning according to the present invention to be implemented. Thus, in the case of tables according to the invention, a table always has a 'timestamp' column and the table is partitioned by time intervals which can be of the order of a minute; the retention policy can be of the order of one or more years.

The partitioning according to the invention is managed by the storage engine. Each partition has its indexes. The partitions can be browsed in parallel in order to reduce the response time on multi-core or multiprocessor systems.

Figure 1:
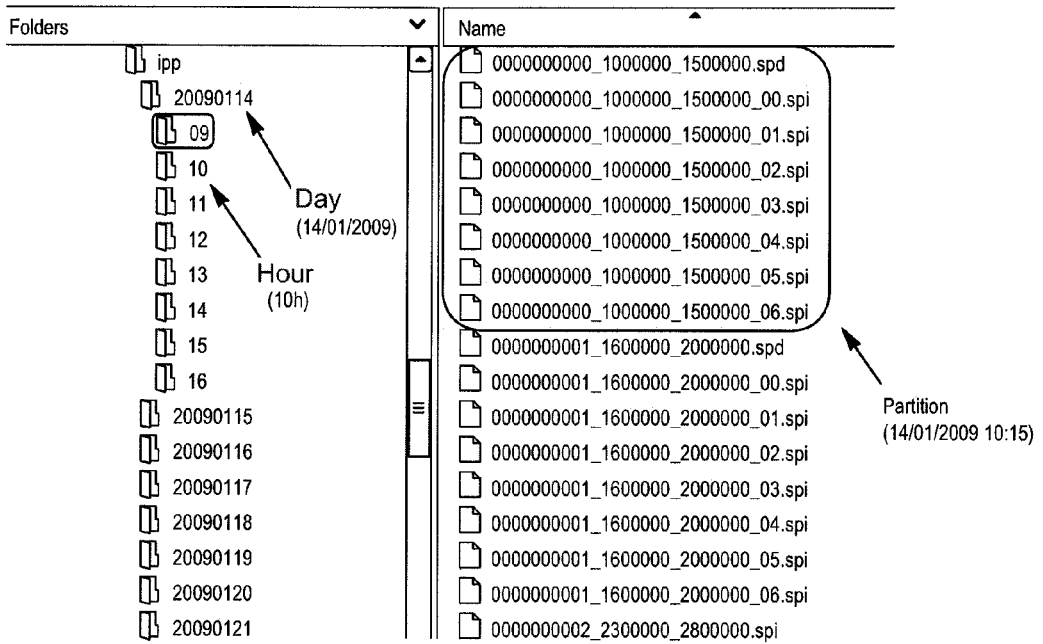
FIG. 1 is a view showing the tree structure of the partitions of a table according to the invention.

The partition files are grouped in sub-directories of a file system. These directories form a tree, each node of which is identified uniquely from a timestamp as shown in FIG. 1. This figure shows the tree structure of the partitions for the 'ipp' table. File names with the suffix '.spd' correspond to the data files and those with the suffix '.spi' to the index files. There are 7 '.spi' files for one partition as the 'ipp' table has 7 indexes. The tree structure has a number of levels which depend on the time interval used for the partitioning.

The database according to the invention comprises the possibility of defining a different time interval for the partitioning according to the age of the data. For example, the data for the current month are partitioned by hour, then the data for the next three months are partitioned by the day; finally the oldest data are partitioned by the month.

The system therefore has the ability to progressively merge the partitions into larger partitions as the data that they contain age. The operation is carried out by using the 'timestamp' column.

Moreover, in order to optimize the insertions, the partitions are built in memory before they are written to disk. In order to provide access to the data in real time, SQL queries can take account of the data in memory before they are written to disk. This functionality benefits from partition merger. The latter makes it possible to retain a partition size compatible with the memory available for the partitions to be built.

Figure 2:
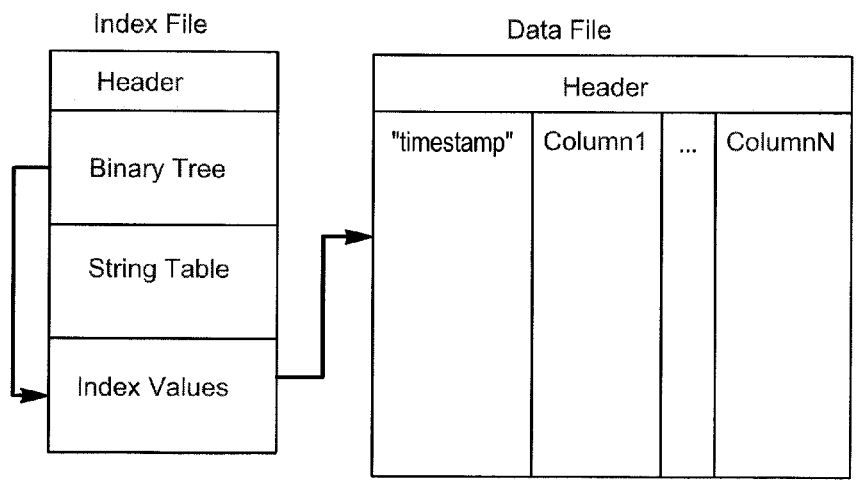
FIG. 2 is a simplified diagram showing a data file and one of the associated index files.

Each partition consists of a data file and a file for each of the indexes. FIG. 2 depicts the structure of an index file for a partition. An index file consists of a header, a binary tree, a string table section, as well as an optional section for the index values. The space allocated to the binary tree is limited; if the limit is not reached, each node of the tree contains the index values corresponding to one row of the table, otherwise, the index values are stored in the optional section at the end of the file.

The binary trees are produced using a TreeOrder bijective function. This function makes it possible to generate a perfect binary tree for an index and to write it sequentially to a file. A perfect binary tree allows half the remaining values to be deleted, when browsing the tree, each time a further depth level is reached.

Let $(V_i), i \in [0,n]$ be a list of values for which there is an order relationship and let O be a function such that if $O(i) > O(j)$ then $V_{O(i)} \geq V_{O(j)}$.

By way of example, for a series of 7 elements:

$V_0, V_1, V_2, V_3, V_4, V_5, V_6$.

After sorting according to an order relationship, this list is as follows:

$V_2, V_4, V_1, V_6, V_3, V_5, V_0$

Therefore $O(0)=2, O(1)=4, O(2)=1, O(3)=6, O(4)=3, O(5)=5$ and $O(6)=0$. Let V' be the series defined by $V'_i = V_{O(i)}$, then the series $(V_2, V_4, V_6, V_3, V_5, V_0)$ can also be written $(V'_0, V'_1, V'_2, V'_3, V'_4, V'_5, V'_6)$.

Figure 3:
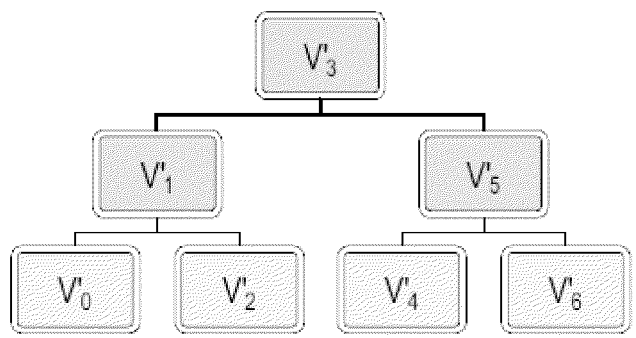
FIG. 3 is a simplified diagram showing the flowchart of a perfect binary tree according to the invention.

The perfect binary tree containing all the elements of the list $(V_i)$ is depicted in FIG. 3. Let v be a value for which the order function is defined. In order to know whether v is a value of the series V, it is sufficient to compare v and $V'_3$. If $v < V'_3$ then v must be compared to $V'_1$. If $v < V'_1$, v is compared to $V'_0$. If $v < V'_0$ then v does not form part of the list and this was found in 3 iterations. When v is greater than the value of the node, it is sufficient to compare v with the right-hand child node.

Figure 4:
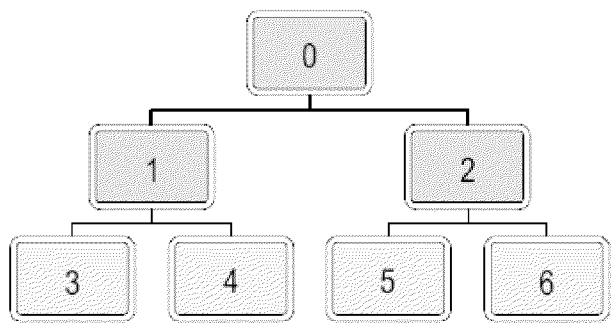
FIG. 4 is a simplified diagram showing the numbering of the nodes of the perfect binary tree in FIG. 3.

If the nodes of the tree in FIG. 3 are numbered from top to bottom and from left to right, the result in FIG. 4 is obtained.

Figure 5:
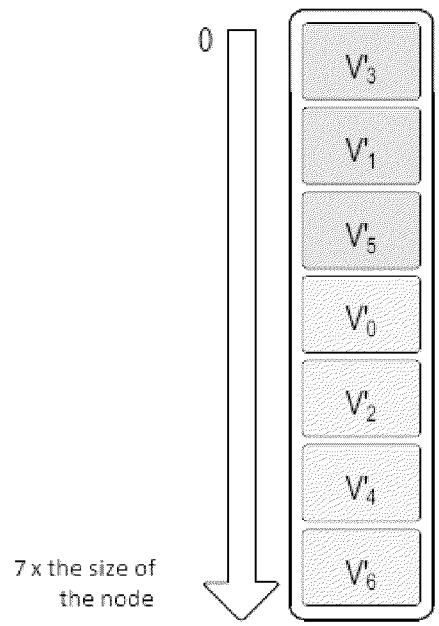
FIG. 5 is a simplified diagram showing a section of the perfect binary tree in FIG. 3 stored in the index file.

Now the nodes must be written to the index files. However, a file is a one-dimensional space. The nodes are written one after another in accordance with their numbering, as shown in FIG. 5.

TreeOrder provides the position of a node in the "binary tree" section of the index file according to the rank of the value associated with this node in the sorted list V' and the cardinality of this same list.

Figures 6, 7, 8:
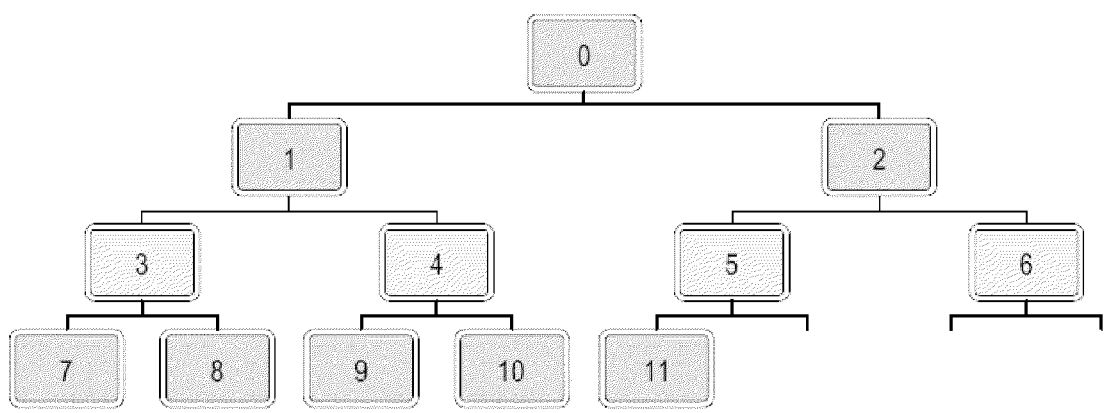
FIG. 6 is a diagrammatic view of a table representing the correspondence performed by the bijective function TreeOrder for a list of seven elements.
FIG. 7 is a simplified diagram showing a flowchart of an incomplete perfect binary tree with twelve nodes numbered in the order of writing.
FIG. 8 is a diagrammatic view of a table representing the comparison of the positions between a complete perfect binary tree of cardinal 15 and an incomplete perfect binary tree of cardinal 12.

FIG. 6 shows the correspondence established by TreeOrder for a table having 7 elements.

As the TreeOrder function is bijective, there is an inverse function TreeOrder$^{-1}$ which also allows the order in the list to be found from the position in which it was recorded in the file, which is useful when the index is browsed.

If the index does not comprise $2^n-1$ values, the tree is incomplete and the behaviour of the TreeOrder function must be modified to take account of the fact that the last level of the tree comprises fewer leaves than a complete tree.

As shown in FIG. 7, in the case of an incomplete tree, part of the leaves must be deleted.

FIG. 8 shows the correspondence between the index and the position for an incomplete tree. It is clear that with respect to the complete tree the conversion is not trivial, as potentially all of the positions can change.

For any cardinality C, the smallest cardinality of the complete tree capable of containing C nodes is found. That is: $N=2^{roundup(log\ 2(C))}-1$.

Starting from the position TreeOrder$_N$(i) in the complete tree for an index i<C, the position TreeOrder$_C$(i) in the complete tree is found as follows:

Let L=C*2−N.
If TreeOrder$_N$(i)>L then
   TreeOrder$_C$(i)=TreeOrder$_N$(i)−(TreeOrder$_N$(i)−L)/2
Else
   TreeOrder$_C$(i)=TreeOrder$_N$(i)

Further to the above, one of the contexts of use of the method according to the invention is the operation of records of the "Internet Protocol Detail Record" (IPDR) type. These are records describing the use of an IP service. To this end, these records comprise one or more IP addresses. These IP addresses correspond either to the consumer of the service, or to the provider. But in order to use the IPDRs, it is useful to be able to resolve these IP addresses to more meaningful names. This is done by using the DNS protocol. However in some cases, although an identity name remains unchanged over time, its IP address can change. This is the case for example in the networks using Dynamic Host Configuration Protocol (DHCP) technology. So that an IPDR remains operable over time, it is provided to store the IP addresses that it contains, and also the names resulting from resolution of these addresses at the time the IPDR was produced, since delaying resolution to the time the IPDR is used can lead to a different and therefore false result.

Carrying out DNS resolution at the time when the IPDR is inserted in the database brings other advantages. In particular, as the resolution has already been carried out, the query time of the IPDR tables is quicker when names are required. To this end, the system for managing a database according to the invention comprises a software module capable carrying out many DNS resolutions in parallel without consuming too many system resources, as the services provided by operating systems are not designed for such a use.

The present invention therefore offers the possibility to configure an SQL table by defining a column as containing the results of the DNS resolution of IP addresses contained in another column of the table. A table can contain several of these IP/Name pairs.

In addition, configuration of the table makes it possible to choose a specific list of DNS servers as a function of a column value. FIG. 10 shows an example configuration. The "DNS Identifier" field shows which column contains the value, for a given recording, which makes it possible to select the DNS server group to be queried in order to carry out the resolution. In the example of FIG. 9 where an IPDR table is defined, the serviceId column is used. If the serviceId is 12, the group will be (10.1.13.12, 10.1.13.13), if the serviceId is 13, the group will be (10.1.13.14, 10.1.13.15). For any other value, the DNS server of the system hosting the database according to the invention will be queried (*:host=@default). The servers in a group are queried in turn, in order to smooth the load on the group as a whole and to optimize the resolution time.

Of course, the invention is not limited to the examples which have just been described, and numerous adjustments can be made to these examples without exceeding the scope of the invention.

The invention claimed is:

1. A system, including a computer processor, for managing a relational database of the SQL type for information technology and network infrastructure service information, said system comprising:
   a read-only data storage engine;
   unmodifiable tables managed by the storage engine;
   each table comprises a column of digital counting data called a "timestamp";
   each table is partitioned by time intervals;
   partition files are grouped in subdirectories of a file system, the subdirectories forming a tree structure, each node of which is uniquely identified from a timestamp; and
   each partition file comprises a data file and at least one index file enclosing a perfect binary tree, and a bijective function called TreeOrder is used for generating said perfect binary tree and to write values of said perfect binary tree sequentially in the index file according to an existing order relationship between the values of the perfect binary tree, wherein TreeOrder provides a position of a node in the perfect binary tree section of the index file according to a rank of a value associated with the node;
   wherein TreeOrder is used for establishing the correspondence between each node of the perfect binary tree, the nodes being numbered from top to bottom and from left to right, and the values of the perfect binary tree when stored in a section of the index file;
   wherein a correspondence consists of providing a position of each node in the section of the index file according to the position of a corresponding value in a list established according to said order relationship and according to a cardinality of the list; and
   wherein when the perfect binary tree is incomplete and has a cardinality equal to C, the values of the incomplete perfect binary tree are classified with respect to a smallest complete perfect binary tree of cardinal N containing C nodes as follows:
   starting from a position TreeOrder$_N$(i) in the complete perfect binary tree for an I<C, with I an index of the table, a position TreeOrder$_N$(i) is determined in the incomplete perfect binary tree as follows:
   Let L=C*2−N, with $N=2^{roundup(log2(c))}-1$
   If TreeOrder$_N$(i)>L then
     TreeOrder$_c$(i)=TreeOrder$_N$(i)−(TreeOrder$_N$(i)−L)/2
   Else
     TreeOrder$_c$(i)=TreeOrder$_N$(i).

2. The system according to claim 1,
   wherein the column called "timestamp" is used to merge partitions together into a new partition, and a time interval is defined for the new partition according to the age of the data contained therein, whereby older data is partitioned with a greater interval than newer data.

3. The system according to claim 2, characterized in that the partitions are firstly built in memory then written to a disk, said partitions in memory being accessible by queries of the SQL type.

4. The system according to claim 1, characterized in that each index file comprises:

a header;
a perfect binary tree;
a section of string tables; and
an optional section for index values.

5. The system according to claim 4, characterized in that when space allocated to the perfect binary tree in the index file is fully used by values, additional values are then stored in the optional section.

6. The system according to claim 1, characterized in that when a table contains IP-addresses in a first column, the table contains a second column containing results of DNS resolution of said IP addresses, the resolution being carried out during integration of said IP addresses into the first column.

7. The system according to claim 6, characterized in that the storage engine comprises a module carrying out DNS resolutions in parallel.

8. The system according to claim 1, characterized in that each index file comprises:
a header;
a perfect binary tree;
a section of string tables; and
an optional section for index values.

\* \* \* \* \*